May 4, 1965 W. TAYLOR 3,181,369
SAMPLING DEVICE FOR BULK MATERIALS
Filed March 8, 1962 3 Sheets-Sheet 1
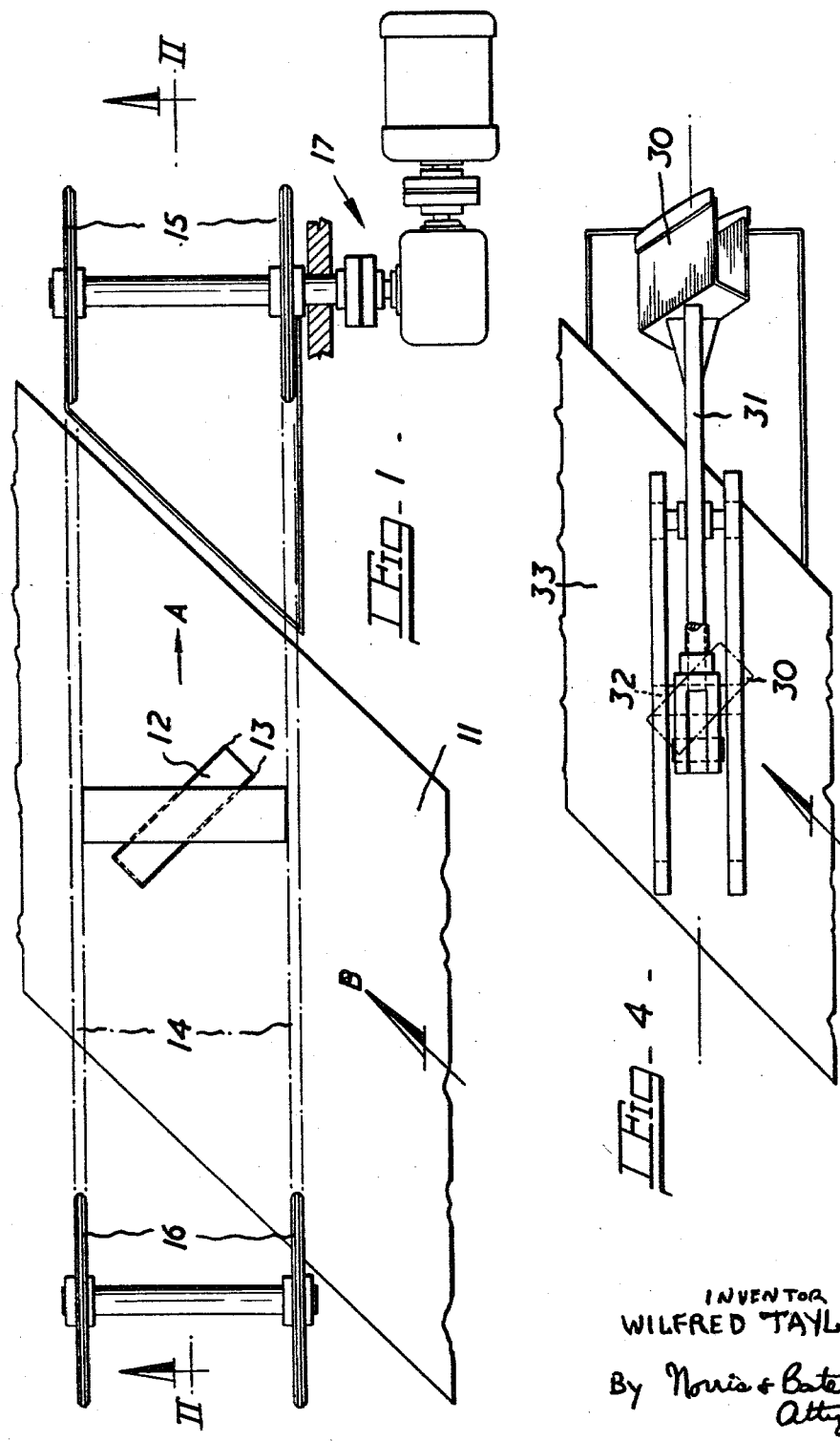
INVENTOR
WILFRED TAYLOR
By Norris & Bateman
attys

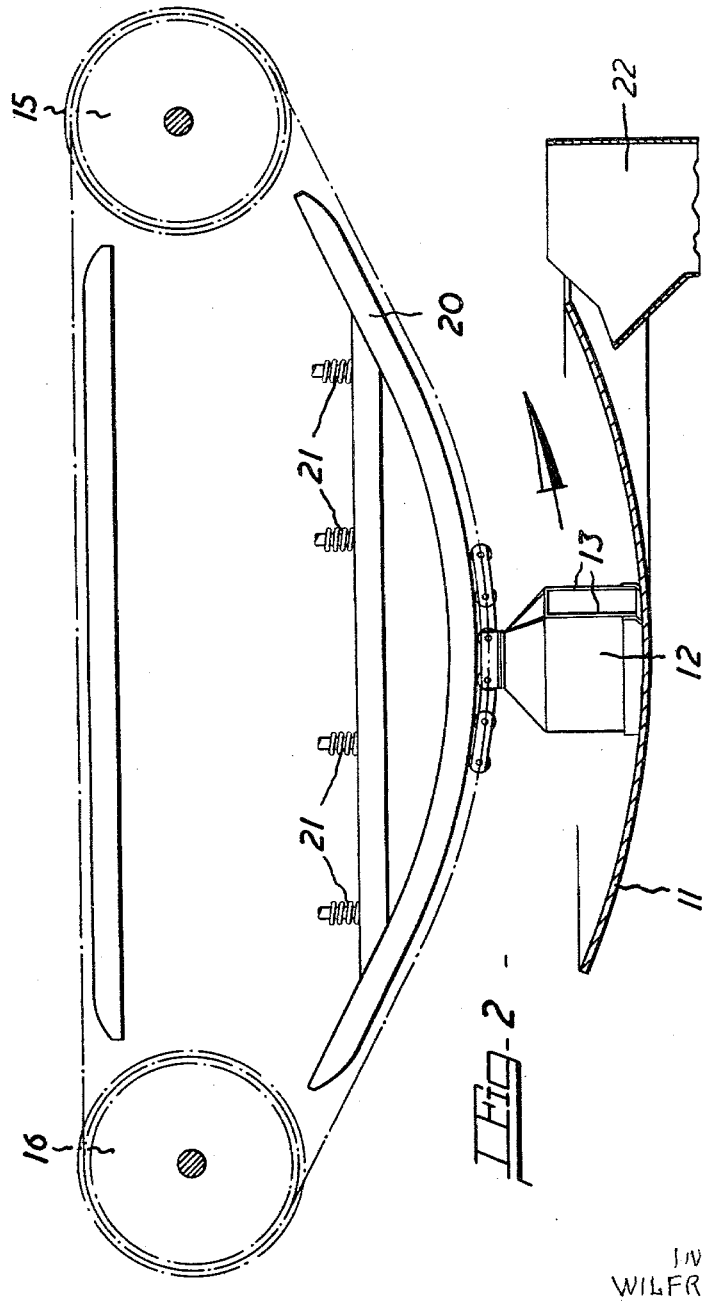

May 4, 1965 W. TAYLOR 3,181,369
SAMPLING DEVICE FOR BULK MATERIALS
Filed March 8, 1962 3 Sheets-Sheet 3
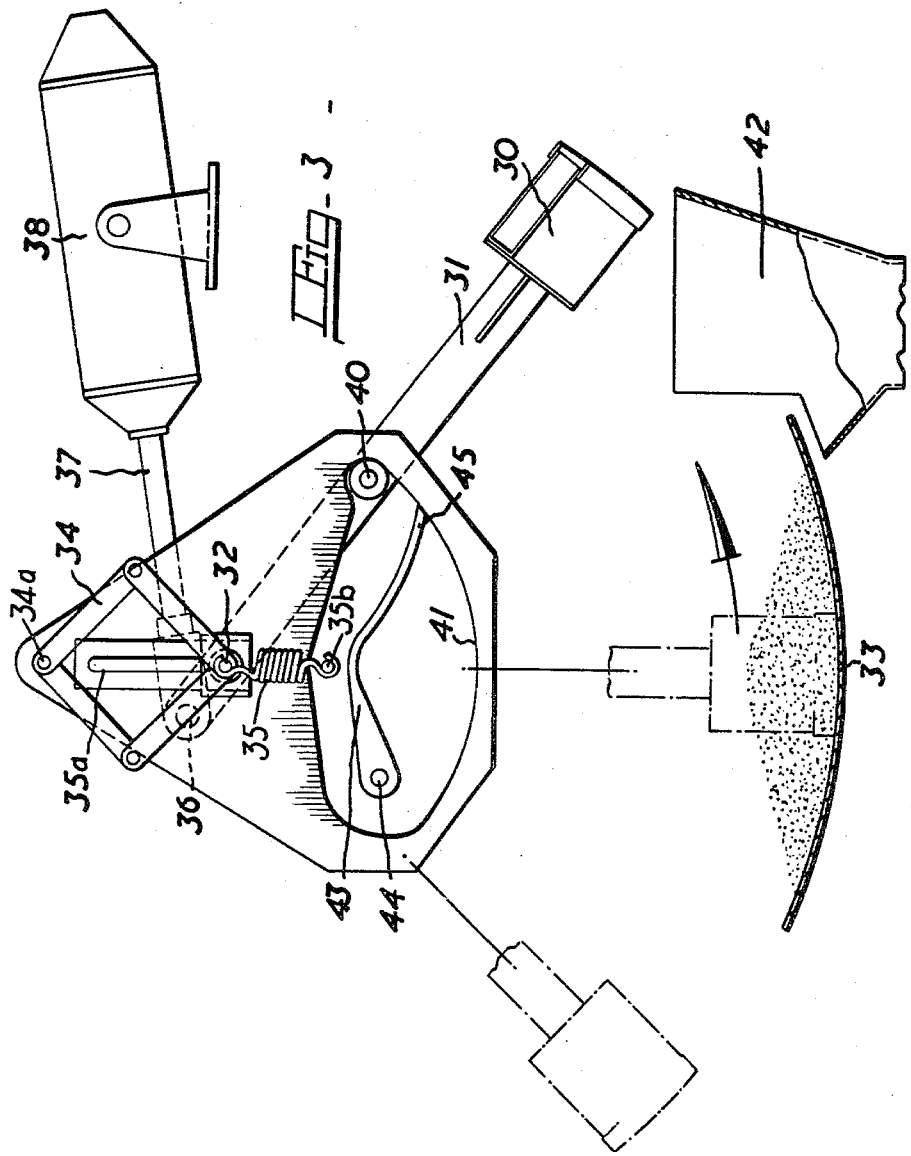
INVENTOR
WILFRED TAYLOR
By: Norris & Bateman
Attys

United States Patent Office 3,181,369
Patented May 4, 1965

3,181,369
SAMPLING DEVICE FOR BULK MATERIALS
Wilfred Taylor, Newcastle-upon-Tyne, England, assignor to The Birmingham Small Arms Company Limited, Birmingham, England, a British company
Filed Mar. 8, 1962, Ser. No. 178,384
10 Claims. (Cl. 73—421)

This invention relates to sampling devices for bulk materials, and is concerned with the sampling of material being carried by a moving belt conveyor.

In order to obtain a true sample from material on a conveyor belt, the sample must be a true cross section of the mass of material on the belt. That is, it must be taken from between two planes at right angles to the run of the belt.

Hitherto, when it has been desired to take such a true sample from material on a conveyor belt it has been usual to stop the belt and cut the sample out by hand or by other means.

In one method of taking a sample from a moving belt a sample collector or cutter is moved across the belt at right angles to the belt. However, due to the movement of the belt the relative motion between the collector and the belt is not at right angles to the run of the belt.

In one known device for taking a true sample from a moving belt a cutter or collector is mounted on a carriage straddling or overhanging the belt at right angles to the run. When it is desired to take a sample the carriage is accelerated to belt speed in the direction of movement of the belt and then the cutter or collector is caused to move across the belt on the carriage, separate drives thus being required for the carriage and the cutter or collector.

According to the invention a device adapted for use in taking a sample from bulk material on a moving conveyor belt comprises a cutter or collector for cutting or collecting the sample, means for supporting the cutter or collector over the belt so that in use it moves across the material-carrying surface of the belt in a substantially straight path inclined to the direction of movement of the belt at an angle less than a right angle, and means for moving the cutter or collector at substantially uniform speed along its path, the arrangement being such that the angle of inclination and the substantially uniform speed are so determined in relation to each other and to the speed of movement of the belt that the movement of the cutter or collector relative to the material-carrying surface of the belt is at right angles in the direction of movement of the belt.

If B is the speed of the belt and $\alpha$ is the angle of inclination, then the necessary speed of the cutter or collector along its path is given by B secant $\alpha$.

Means are preferably provided for returning the cutter or collector to its starting position after it has moved across the belt and cut or collected a sample, the returning means being so arranged that the cutter or collector does not pass through the material on the belt as it returns to its starting position.

The cutter or collector is preferably so supported over the belt that its cutting edge and/or collecting opening is/are directed at right angles to the direction of movement of the belt.

The invention will now be described with reference to the accompanying drawings, which are generally of diagrammatic form in which:

FIGURE 1 is a view of one embodiment of the invention;

FIGURE 2 is a view of the apparatus on the line II—II of FIGURE 1;

FIGURE 3 is a side elevation of another embodiment of the invention;

FIGURE 4 is a plan view of the apparatus shown in FIGURE 3.

Referring firstly to FIGURES 1 and 2, a belt 11 carries the material to be sampled. A sampling implement in the form of a collector 12 which is in the form of a rectangular box with open bottom and front ends with reinforced cutting edges 13 at each side of the open front end, is suspended from a pair of endless roller chains 14 mounted on pairs of sprockets 15 and 16 at each side of the belt so that the chains extend across and above the belt. The pair of sprockets 15 is provided with driving means, shown generally at 17, so that the collector can be traversed across the belt in the direction of arrow A. The chains 14 are mounted at a distance above the belt surface such that the collector 12, when traversing the lower runs of the chains will just touch the belt. The lower runs of the chains pass along curved tracks 20 formed with a curvature corresponding to the cross-sectional shape of the belt when loaded, and the tracks are urged downwards by springs 21. This causes the collector to follow a similarly curved path so that it touches the belt surface throughout the whole of its travel; this is shown clearly in FIGURE 2, the collector moving in the direction of the arrow.

As the collector travels across the belt its cutting edges cut through the material carried by the belt and the sample cut between the two edges 13 passes into the collector 12. As the collector passes over the edge of the belt the sample falls through its open bottom and into a suitable receiving chute 22 placed at the side of the belt. As the chains continue to be driven the collector passes around the sprockets and is returned in an inverted position along the upper runs of the chains.

The planes of the two chains, which are parallel, are arranged at an angle of 45° to the direction of movement of the belt which is shown by the arrow B in FIGURE 1; the chains are driven by the driving means 17 at such a linear speed that the collector will move, relative to the belt, in a direction perpendicular to the direction of movement of the belt. The collector is inclined to the planes of the chains at an angle of 45° so as to face in the direction of its movement relative to the belt.

In another embodiment, shown in FIGURES 3 and 4, a sampling implement in the form of a collector 30 of similar form is mounted at the end of an arm 31 having a spindle pivoted about an axis 32 located centrally above the belt 33 and inclined to the direction of movement of the belt at an angle of 45°. The pivot 32 is carried in a toggle linkage 34 spring-loaded at 35 to permit a degree of vertical movement. The arm 31 is of length from its pivot such that the collector will touch the load-carrying surface of the belt. The arm is extended for a short distance beyond its pivot, and this extension is connected at 36 to the operating rod 37 of a ram 38 by means of which the arm may be swung to traverse the collector from side to side of the belt. The ram may be operated by any suitable means such as fluid pressure, electrical or mechanical arrangements.

In order to keep the collector in contact with or close to the surface of the belt throughout its collecting swing, the toggle linkage 34 is spring-loaded downwards as shown at 35 and a follower roller 40 is mounted on the arm 31 for engaging a fixed cam 41 arranged beside the arm. The spindle at 32 is preferably vertically guided in slot 35a, and the lower end of tension spring 35 is suitably anchored at 35b. The upper end of the toggle is pivoted at 34a. The cam is so shaped that the collector 30 will be caused to follow a path corresponding to the cross-sectional shape of the belt when loaded, which may be curved, as shown in FIGURE 3, or otherwise troughed or may be flat.

In its forward swing across the belt the collector takes a sample and deposits it in a chute 42 at the side of the belt in the manner described with respect to the previous embodiment. In order to keep the collector clear of material on the belt during its return stroke a second cam 43, pivoted at one end 44, is arranged above the cam 41 and in the form of a latch. As the arm 31 moves in the collecting stroke, in the direction of the arrow in FIGURE 3, its follower roller 40 will ride below the end 45 of the second cam, displacing this end which afterwards returns into contact with the first cam. On the return swing the roller will ride over this end of the second cam and will be deflected along the second cam surface which is of hump shape so as to lift the collector well clear of the belt during its return swing.

Various other arrangements for driving a collector or cutter, within the scope of the invention will be apparent, the important feature being that the mounting of the collector or cutter driving apparatus is stationary, the path of the cutter or collector is inclined to the direction of movement of the belt at an angle less than a right angle, and the speed of the cutter is such that its movement relative to the belt is at right angles to the direction of movement of the belt.

I claim:

1. In a bulk material sampling device, a longitudinally-movable bulk material handling belt, at least one rotatable sprocket wheel situated above each edge of the belt, a chain assembly comprising at least one endless chain, the chain assembly drivingly engaging at least one sprocket wheel above each edge of the belt, a sampling implement supported on the chain assembly, said sampling implement being constructed to remove from the belt a transverse section of the moving material when moved across the belt, and the sprocket wheels being so mounted in relation to the belt that the lower run of the chain crosses the belt in a direction inclined to the direction of movement of the belt at an angle less than a right angle, belt driving means engaging the belt, sprocket wheel driving means engaging at least one sprocket wheel to drive the sampling implement across the belt at a speed substantially equal to the product of the speed of the belt and the secant of the angle of inclination between the direction of movement of the belt and the run of the chain.

2. Bulk-material sampling device according to claim 1, including a cam-track engaging the lower run of the chain assembly, the cam-track being curved similarly to the cross-sectional shape of the loaded belt.

3. In a bulk material sampling device, a longitudinally-movable bulk material handling belt, a fixed support above the belt, a pivotal axis on the support above the belt inclined to the direction of movement of the belt at an angle less than a right angle, an arm pivoted upon the pivoted axis, a sampling implement attached to said arm, said sampling implement being constructed to remove from the belt a transverse section of the moving material when moved across the belt, belt driving means engaging the belt, and ram driving means connected to the arm, the speed of swinging of the sampling implement across the belt being substantially equal to the product of the speed of the belt and the secant of the angle between the direction of movement of the belt and the pivotal axis of the support.

4. Bulk-material sampling device according to claim 3 including a freely rotatable roller mounted on the arm and rotatable about an axis parallel to the pivotal axis on the support, means resiliently mounting said pivotal axis on the support, a first cam member having a curvature corresponding to the cross-sectional shape of the loaded belt, the first cam member being fixed to the support and engaging the roller.

5. Bulk-material sampling means according to claim 4, including a hump-shaped second cam member hinged at one end thereof to the support and disposed above the first cam member, the other end of the second cam member engaging the surface of the first cam member, said second cam member being disposed to permit travel of said roller along said first cam member during the material removing stroke of said sampling implement but to intercept said roller and raise said sampling implement above the material on said belt during return stroke of said sampling implement.

6. In a sampling device for use in taking a sample from bulk material carried on a moving conveyor belt, a support, a sampling implement constructed to remove from the belt a transverse section of the moving material when moved across the belt mounted on said support for transverse movement across the belt in a direction inclined to the direction of movement of said belt at an angle less than a right angle, means for driving said implement transversely across said belt, the speed of the transversely driven sampling implement being substanitally equal to the product of the speed of the belt and the secant of said angle of inclination so that the sampling implement moves relative to the material carrying surface of the moving conveyor belt at right angles to the direction of movement of the belt.

7. In sampling apparatus for taking at least one material sample from a longitudinally moving conveyor belt carrying bulk material, means for continuously moving said conveyor in a given direction at a predetermined speed, means mounting a sampling implement above said belt for movement across said belt in a transverse direction inclined relatively to the direction of movement of said belt, said implement being constructed to remove a transverse section of said material from the belt when moved thereacross, and means for continuously moving said implement across said belt in said transverse direction at a speed so related to the belt speed that said implement substantially always moves relative to the material carrying surface of said belt at substantially right angles to the direction of movement of said belt.

8. In the sampling apparatus defined in claim 7, means operative after said implement has crossed the belt in said transverse direction for returning said implement transversely back across said belt out of contact with the material on said belt.

9. In the sampling apparatus defined in claim 7, said sampling implement being mounted on endless chain means supported at opposite sides of the belt on sprockets and extending angularly across the belt.

10. In the sampling apparatus defined in claim 7, said sampling implement being mounted on an arm swingably mounted on an axis above said belt and extending angularly transversely of said belt.

No references cited.

RICHARD C. QUEISSER, *Primary Examiner.*